(12) United States Patent
Lim

(10) Patent No.: US 8,777,330 B2
(45) Date of Patent: Jul. 15, 2014

(54) BICYCLE AXLE ASSEMBLY

(75) Inventor: Puat Thiam Lim, Osaka (JP)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 370 days.

(21) Appl. No.: 13/309,564

(22) Filed: Dec. 2, 2011

(65) Prior Publication Data

US 2013/0140876 A1    Jun. 6, 2013

(51) Int. Cl.
*B62K 25/02* (2006.01)

(52) U.S. Cl.
USPC ..................................... 301/124.2

(58) Field of Classification Search
CPC ......... F16B 37/08; B62K 25/02; B60B 35/04; B60B 27/023; B60B 27/206; F16L 37/24
USPC ............. 301/110.5, 110.6, 124.1, 124.2, 132; 280/279, 280, 288
See application file for complete search history.

(56) References Cited

U.S. PATENT DOCUMENTS

| | | | | |
|---|---|---|---|---|
| 3,610,659 | A * | 10/1971 | Gerarde | 280/169 |
| 4,028,915 | A * | 6/1977 | Stahl | 70/233 |
| 4,724,692 | A * | 2/1988 | Turin et al. | 70/225 |
| 4,964,287 | A | 10/1990 | Gaul | |
| 5,007,260 | A * | 4/1991 | Sharp | 70/233 |
| 5,291,763 | A * | 3/1994 | Cuisinot | 70/201 |
| 5,984,423 | A * | 11/1999 | Becker | 301/110.5 |
| 6,669,306 | B1 | 12/2003 | Hara et al. | |
| 6,742,849 | B1 * | 6/2004 | Denby | 301/124.2 |
| 7,654,548 | B2 * | 2/2010 | Kanehisa et al. | 280/279 |
| 2007/0154286 | A1 | 7/2007 | Spahr | |
| 2008/0197602 | A1 * | 8/2008 | Watarai | 280/281.1 |
| 2009/0072613 | A1 | 3/2009 | Inoue et al. | |

FOREIGN PATENT DOCUMENTS

| | | |
|---|---|---|
| EP | 521447 A1 * | 1/1993 |
| EP | 1 413 506 B1 | 2/2006 |
| EP | 1801005 A1 | 6/2007 |
| FR | 998986 A * | 1/1952 |
| WO | WO-99/19636 A1 | 4/1999 |
| WO | WO-01/57347 A1 | 8/2001 |

OTHER PUBLICATIONS

European Search Report of corresponding EP Application No. 12 17 9601.5 dated Feb. 5, 2013.

* cited by examiner

*Primary Examiner* — Kip T Kotter
(74) *Attorney, Agent, or Firm* — Global IP Counselors

(57) ABSTRACT

A bicycle axle assembly has a nut member that includes a first part and a second part. The first part has an internal thread. The second part has a projection that is arranged to engage a dropout of a bicycle frame. The first and second parts have first and second anti-rotational structures, respectively, that move relative to each other between an engaged position, in which the first and second parts are non-rotatably engaged relative to each other by the first and second anti-rotational structures, and a disengaged position, in which the first and second mating anti-rotational structures are disengaged such that the first and second parts rotate relative to each other.

12 Claims, 10 Drawing Sheets

US 8,777,330 B2

BICYCLE AXLE ASSEMBLY

BACKGROUND

1. Field of the Invention

This invention generally relates to a bicycle axle assembly. More specifically, the present invention relates to a bicycle axle assembly having a nut member with a locking projection for engaging a dropout of a bicycle frame while the bicycle axle assembly is in an installed position.

2. Background Information

In the past various bicycle parts have been attached using nut and bolt arrangements. However, while certain bicycle parts are designed to be permanently attached to the bicycle, other bicycle parts such as bicycle wheels need to be loosened and removed relatively often. For example, bicycle wheels need to be removed from the frame whenever there is a flat tire. Moreover, bicycle wheels often need to be removed in order to transport a bicycle in an automobile.

Due to the need to remove and reinstall bicycle wheels, bicycle wheel hubs have been provided with quick release mechanisms in order to facilitate easier removal and reinstallation of the wheels. A typical quick release device includes a skewer or shaft with a threaded end having a quick release member mounted at the other end. The quick release member includes a base with a lever and a cam structure. A nut is detachably threaded onto the threaded end of the skewer after the skewer is inserted through the hub body. The fork flanges of the frame are arranged adjacent the base of the quick release member and the hub body and between the nut and the hub body, respectively. Thus, the hub can be attached to the frame by clamping the fork flanges using the quick release lever. These typical quick release mechanisms generally work well. However, with these typical quick release mechanisms, it is sometimes difficult to remove and reinstall a bicycle wheel with a single person.

SUMMARY

One aspect presented in this disclosure is to provide a bicycle axle assembly that permits a rider to easily remove and reinstall a bicycle wheel from a bicycle frame single-handedly without the need of help from another person to stabilize the bicycle.

Another aspect presented in this disclosure is to provide a bicycle axle assembly that makes reinstalling a wheel such that the wheel has the same axle retaining force that was provided prior to removal of the wheel from the bicycle frame.

In view of the state of the known technology, a bicycle axle assembly has a nut member that includes a first part and a second part. The first part has an internal thread. The second part has a projection that is arranged to engage a dropout of a bicycle frame. The first and second parts have first and second anti-rotational structures, respectively, that move relative to each other between an engaged position, in which the first and second parts are non-rotatably engaged relative to each other by the first and second anti-rotational structures, and a disengaged position, in which the first and second mating anti-rotational structures are disengaged such that the first and second parts rotate relative to each other.

These and other objects, features, aspects and advantages of the bicycle axle assembly will become apparent to those skilled in the art from the following detailed description, which, taken in conjunction with the annexed drawings, discloses one exemplary embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
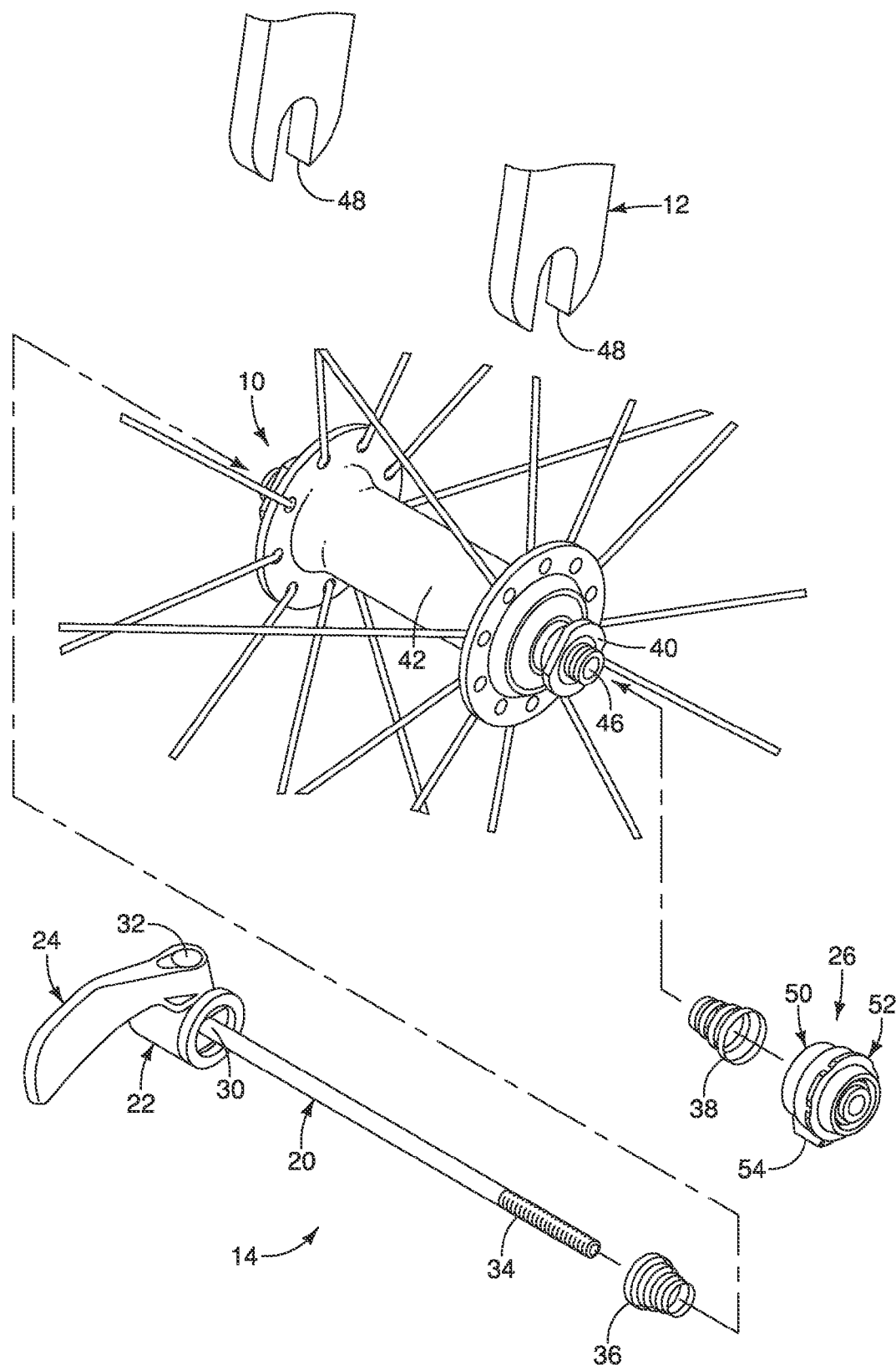
FIG. 1 is an exploded, perspective view of a portion of a bicycle front fork, a front bicycle hub and a bicycle axle assembly in accordance with one exemplary embodiment.
Figure 2:
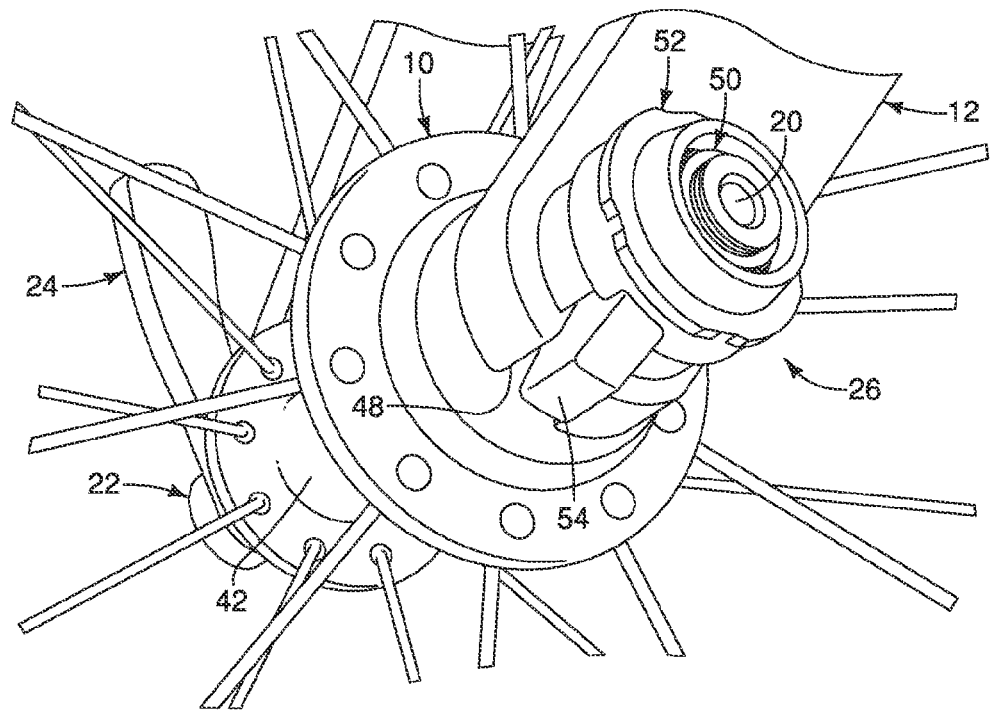
FIG. 2 is an enlarged perspective view of the portion of the bicycle front, the front bicycle hub and the bicycle axle assembly illustrated in FIG. 1, but in an assembled state.

Referring initially to FIGS. 1 and 2, a front bicycle hub 10 is mounted to a bicycle fork 12 using a bicycle axle assembly 14 in accordance with one embodiment. Of course, the bicycle axle assembly 14 is not limited to being used with a front hub. For example, the bicycle axle assembly 14 can be used with a rear hub to connect a rear wheel to the rear portion of the bicycle frame. The bicycle axle assembly 14 is a quick release mechanism for quickly and easily removing and reinstalling the front bicycle hub 10 to the bicycle fork 12. The bicycle axle assembly 14 is a bicycle component that basically includes a skewer or shaft member 20, a head member 22, a lever member 24 and a nut member 26. The shaft member 20 has a center longitudinal axis that also defines a center longitudinal axis A of the bicycle axle assembly 14. Except for the nut member 26, the bicycle axle assembly 14 is a conventional quick release axle that is commonly used with bicycle hubs. In other words, the nut member 26 can be used as a replacement nut for a conventional quick release axle. Thus, the shaft member 20, the head member 22 and the lever member 24 will only be briefly discussed herein.

The shaft member 20, the head member 22 and the lever member 24 are preferably constructed of lightweight rigid materials such as metallic materials that are commonly used for these parts. The head member 22 is movably disposed on a first end 30 of the shaft member 20 by a cam pin 32 of the lever member 24. Thus, the lever member 24 is operatively mounted between the shaft member 20 and the head member 22 via the cam pin 32 to axially move the shaft member 20 relative to the head member 22 in response to movement of the lever member 24. The shaft member 20 has a second end 34 with an external thread. The nut member 26 is threadedly attached to the second end 34 of the shaft member 20. The effective lateral dimension between the head member 22 and the nut member 26 is adjusted by threading the nut member 26 to different axial locations on the shaft member 20.

Figure 3:
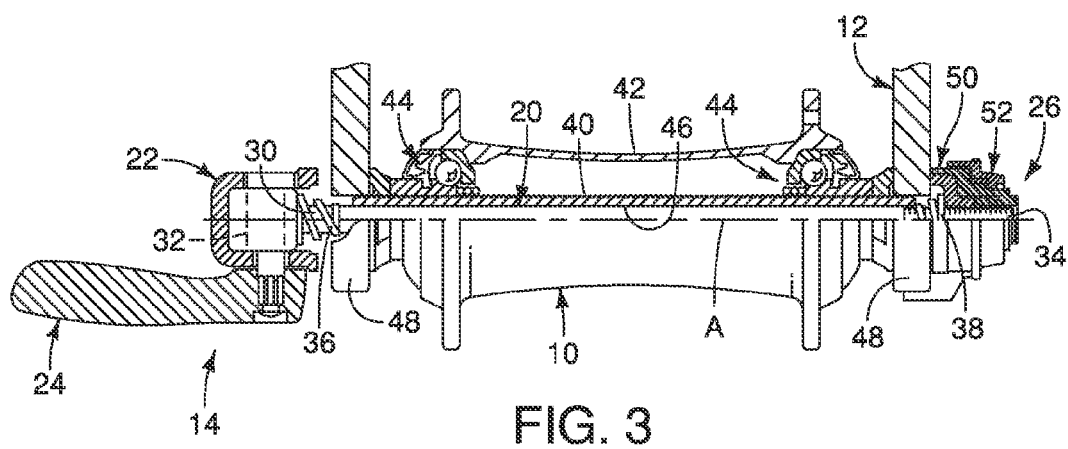
FIG. 3 is a half cross-sectional view of the portion of the bicycle front, the front bicycle hub and the bicycle axle assembly illustrated in FIGS. 1 and 2.
Figure 4:
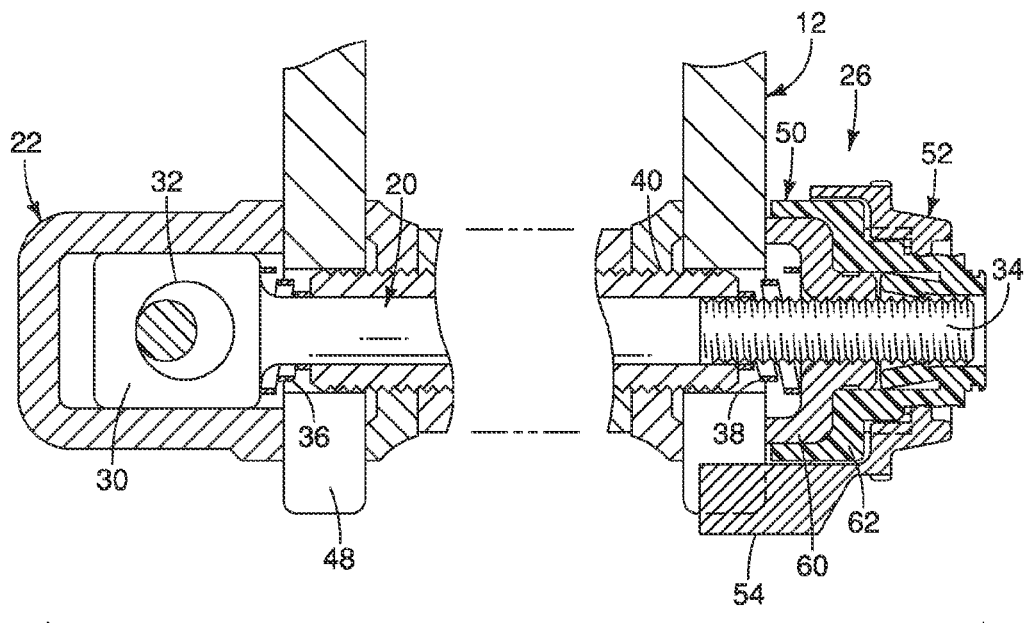
FIG. 4 is a fragmentary cross-sectional view of the portion of the bicycle front, the front bicycle hub and the bicycle axle assembly illustrated in FIGS. 1 and 2 with the nut member in the engaged position.
Figure 5:
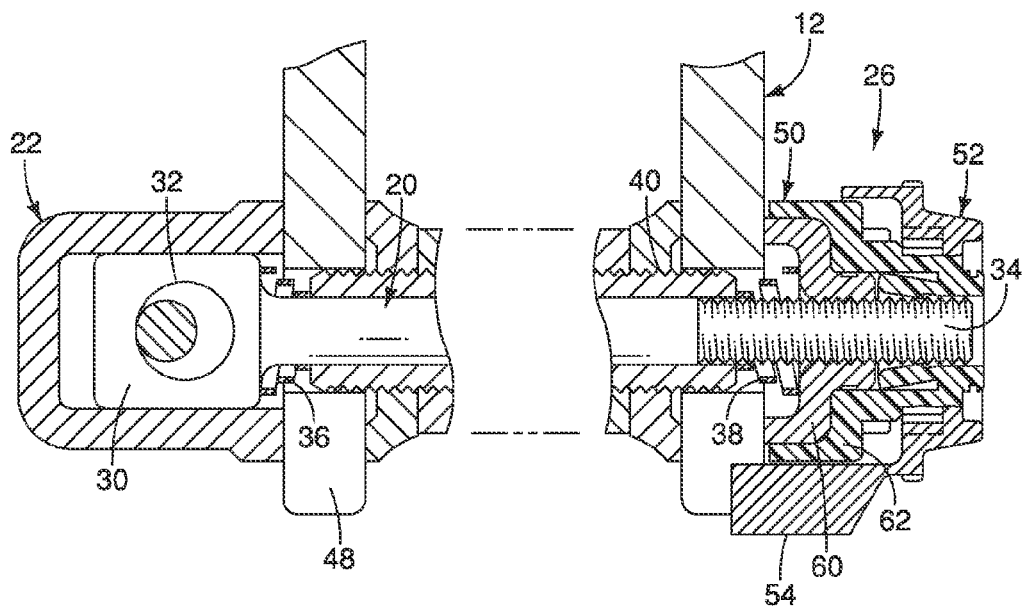
FIG. 5 is a fragmentary cross-sectional view of the portion of the bicycle front, the front bicycle hub and the bicycle axle assembly illustrated in FIGS. 1 and 2 with the nut member in the disengaged position.
Figure 6:
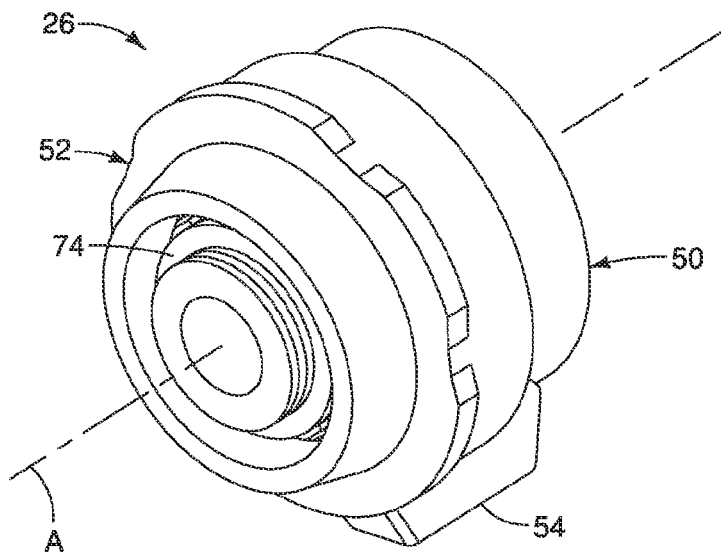
FIG. 6 is an enlarged perspective view of the nut member of the bicycle axle assembly illustrated in FIGS. 1 to 5.

As seen in FIGS. 3 to 5, the bicycle axle assembly 14 typically also includes a pair of compression springs 36 and 38. The compression spring 36 is mounted on the shaft member 20 between the head member 22 and a first end of the bicycle hub 10 for biasing the head member 22 away from the first end of the bicycle hub 10. The compression spring 38 is mounted on the shaft member 20 between the nut member 26 and a second end of the bicycle hub 10 for biasing the nut member 26 away from the second end of the bicycle hub 10.

The bicycle hub 10 will now be briefly discussed relative to FIGS. 1 to 3. The bicycle hub 10 basically includes a hollow spindle or shaft 40 and a hub shell 42 rotatably supported on the spindle 40. Typically, the hub shell 42 is rotatably supported on the spindle 40 by a pair of bearing units 44. The spindle 40 has an internal bore 46 for receiving the shaft member 20 therein. The ends of the spindle 40 are received in the drop-outs 48 of the front fork 12. Since the bicycle axle assembly 14 can be used with any type of hub that has a hollow spindle, the bicycle hub 10 will not be discussed in further detail.

Turning now to FIGS. 4 to 16, the nut member 26 will now be discussed in more detail. The nut member 26 basically includes a first part 50 and a second part 52. As discussed below, the first and second parts 50 and 52 have mating anti-rotational structures such that the first and second parts 50 and 52 are non-rotatably engaged relative to each other. The second part 52 includes a locking projection 54 that is arranged to engage the drop-outs 48 of the front fork 12 while the bicycle axle assembly 14 is in an installed position as seen in FIGS. 2 to 4. Thus, the first and second parts 50 and 52 are limited from rotating relative to the front fork 12 by the locking projection 54 while the bicycle axle assembly 14 is in an installed position as seen in FIGS. 2 to 4. However, as seen in FIG. 5 and as discussed below, the mating anti-rotational structures of the first and second parts 50 and 52 can be disengaged to allow the first part 50 to rotate relative to the second part 52, which is limited from rotating due to the locking projection 54 engaging the drop-outs 48 of the front fork 12.

Figure 7:
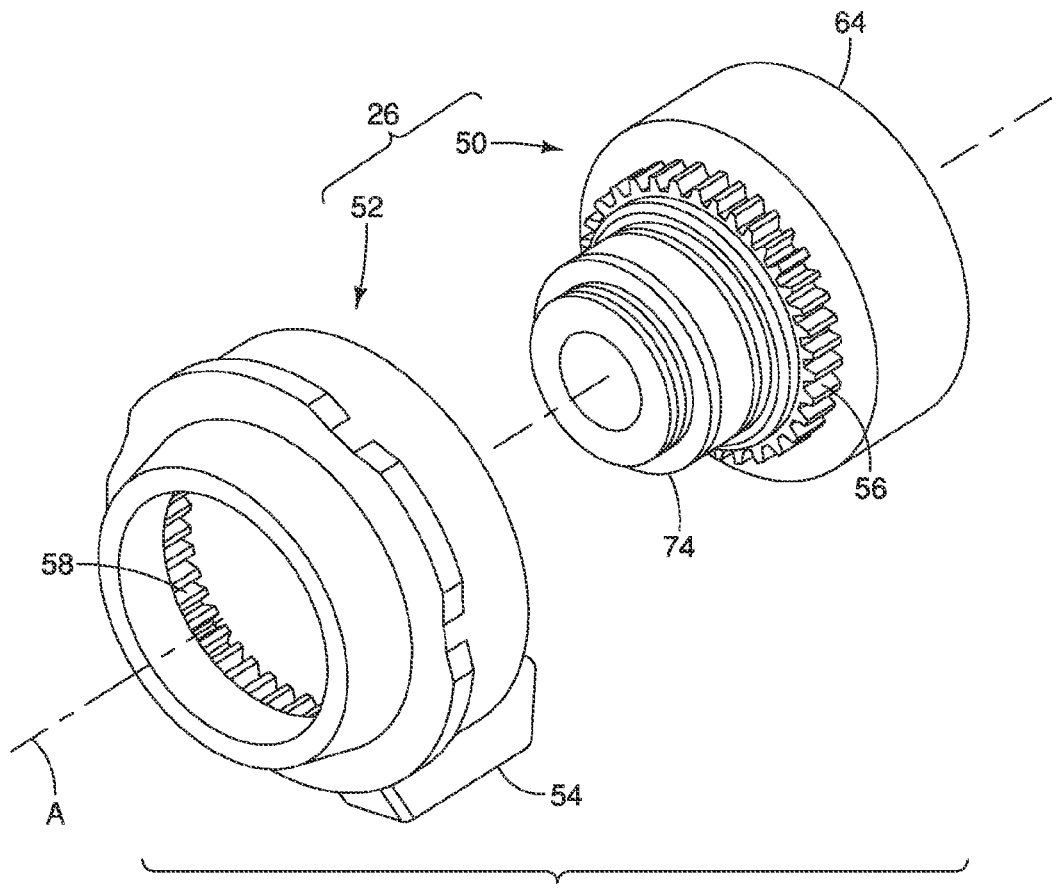
FIG. 7 is an exploded perspective view of the nut member illustrated in FIG. 8.
Figure 8:
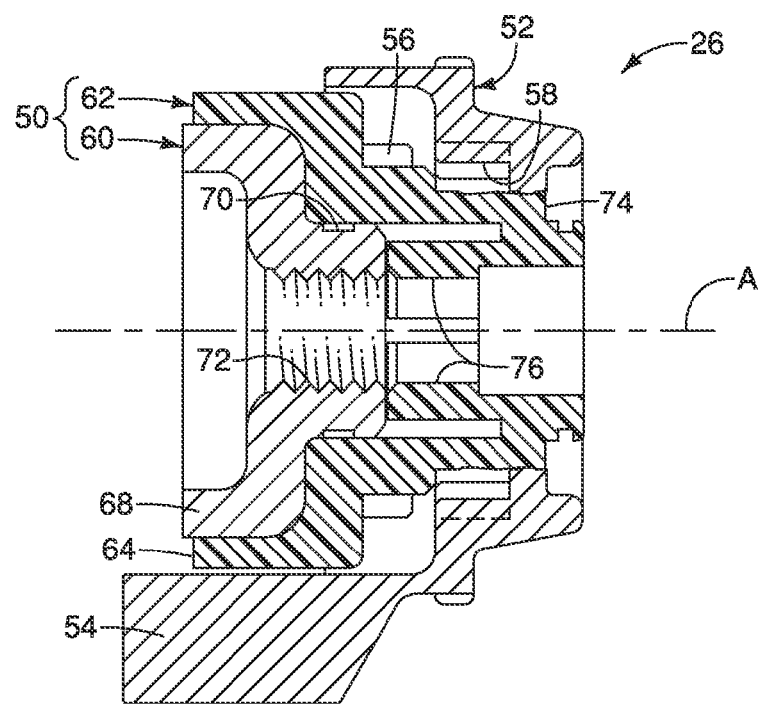
FIG. 8 is a cross-sectional view of the nut member of the bicycle axle assembly in the disengaged position.
Figure 9:
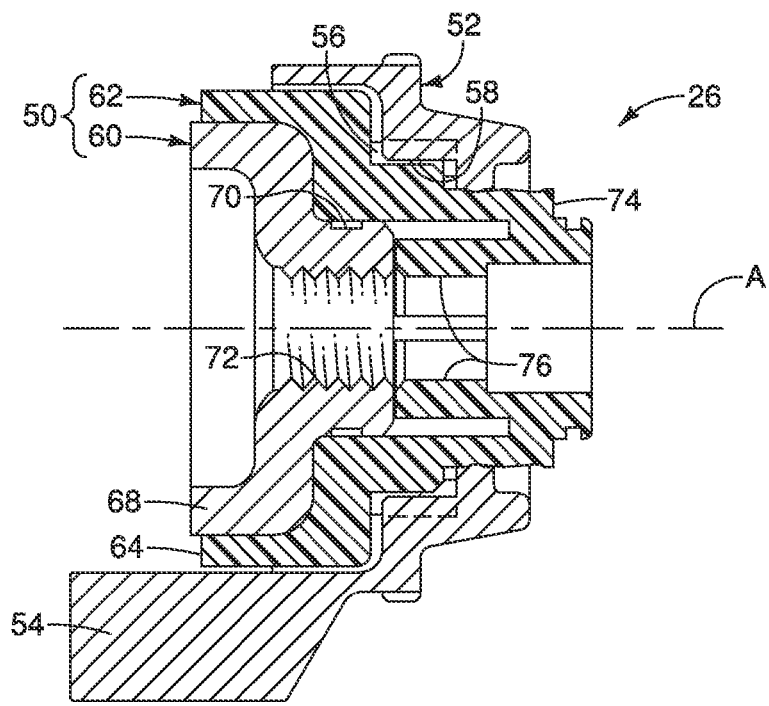
FIG. 9 is a cross-sectional view of the nut member of the bicycle axle assembly in the engaged position.
Figure 10:
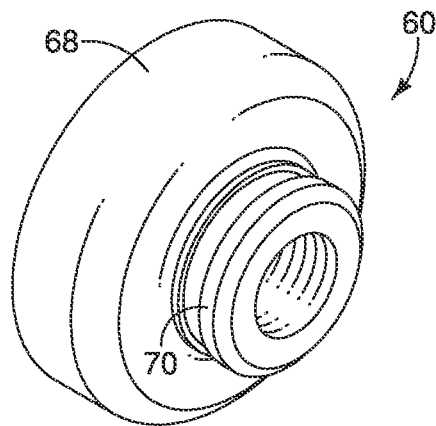
FIG. 10 is a perspective view of the inner portion of the first part of the nut member of the bicycle axle assembly.
Figure 11:
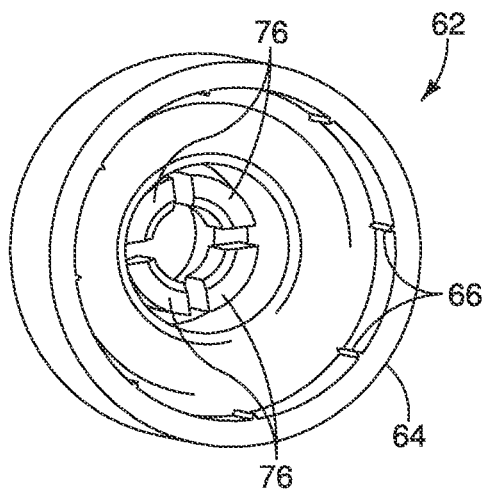
FIG. 11 is a perspective view of the outer portion of the first part of the nut member of the bicycle axle assembly.
Figure 12:
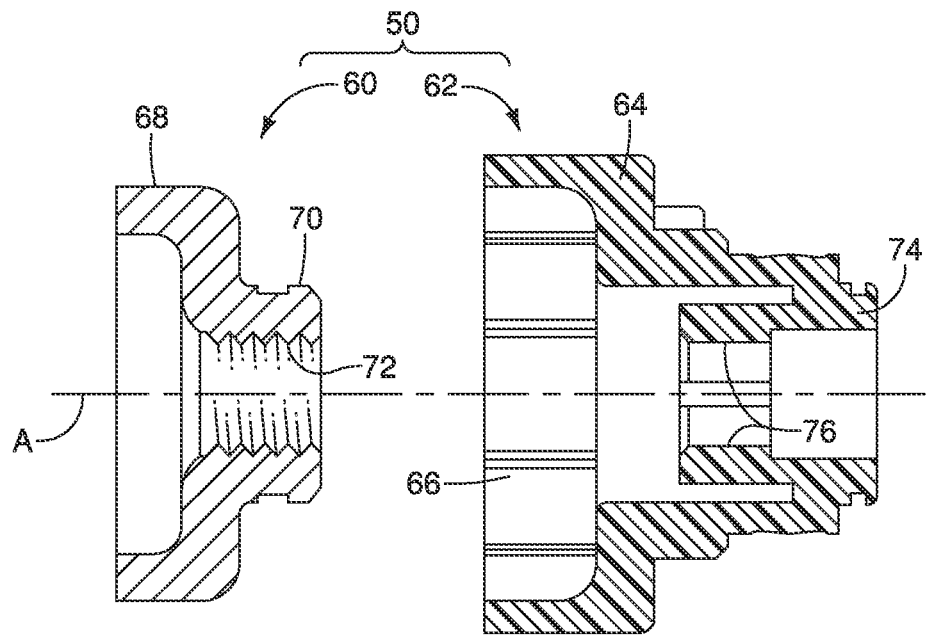
FIG. 12 is an exploded cross-sectional view of the first part of the nut member of the bicycle axle assembly.

In particular, as seen in FIGS. 7 to 9, the first part 50 further includes plurality of first external serrations 56 that constitutes a first mating anti-rotational structure. The second part 52 includes plurality of second internal serrations 58 constitutes a second mating anti-rotational structure. The first external serrations 56 and the second internal serrations 58 are straight longitudinal ribs that extend in an axial direction with respect to the center longitudinal axis A. Thus, the first and second parts 50 and 52 can move axially relative to each other with respect to the center longitudinal axis A between a disengaged position (FIG. 8) and an engaged position (FIG. 9). In the disengaged position (FIG. 8), the first part 50 can freely rotate relative to the second part 52. In the engaged position (FIG. 9), the first part 50 is non-rotatably coupled relative to the second part 52. The locking projection 54 extends axially from the second part 52 with respect to the center longitudinal axis A past a fork contacting surface of the first part 50 of the nut member 26 towards the head member 22.

In the illustrated embodiment, the first part 50 is formed of an inner portion 60 and an outer portion 62. The inner portion 60 is formed of a metallic material, while the outer portion 62 is formed of a non-metallic material such as a plastic resin. Thus, the inner portion 60 is formed of a harder material than the outer portion 62. In this way, as discussed below, the inner portion 60 (harder metallic material) can be threaded onto the second end 34 of the shaft member 20, while the outer portion 62 (softer non-metallic material) can engage the second end 34 of the shaft member 20 to aid in preventing inadvertent loosening of the nut member 26 on the shaft member 20.

Figure 13:
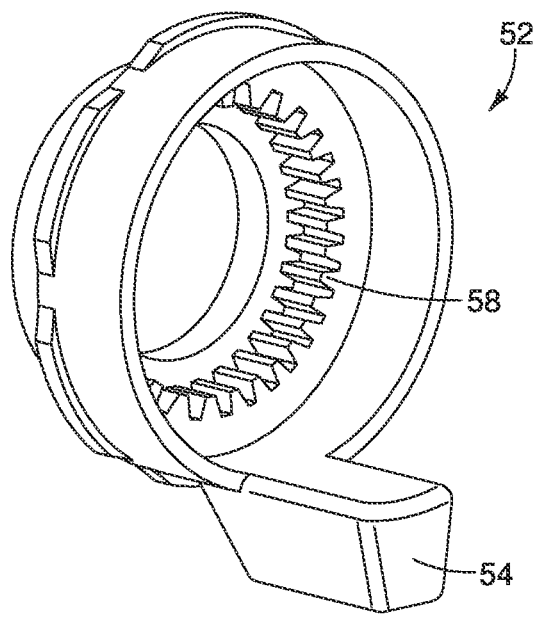
FIG. 13 is a perspective view of the second part of the nut member of the bicycle axle assembly.
Figure 14:
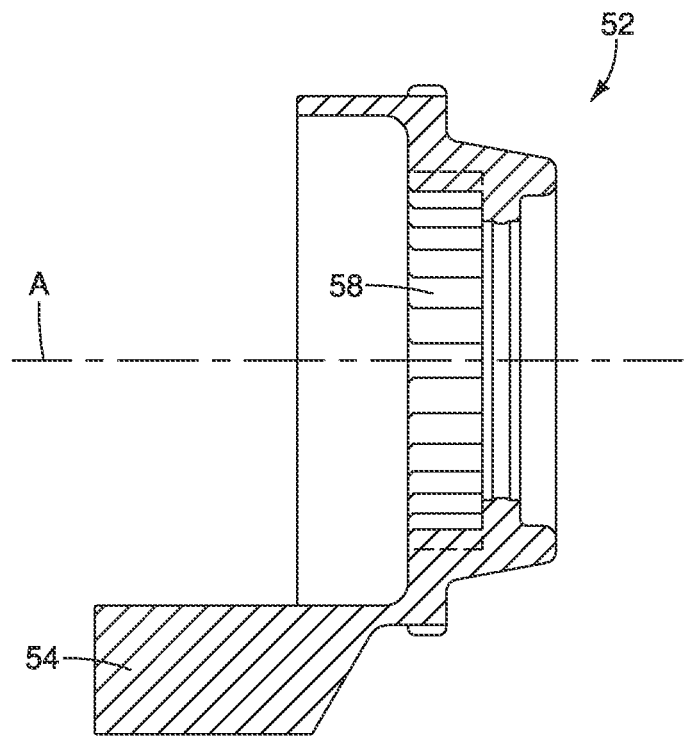
FIG. 14 is a cross-sectional view of the second part of the nut member of the bicycle axle assembly.
Figure 15:
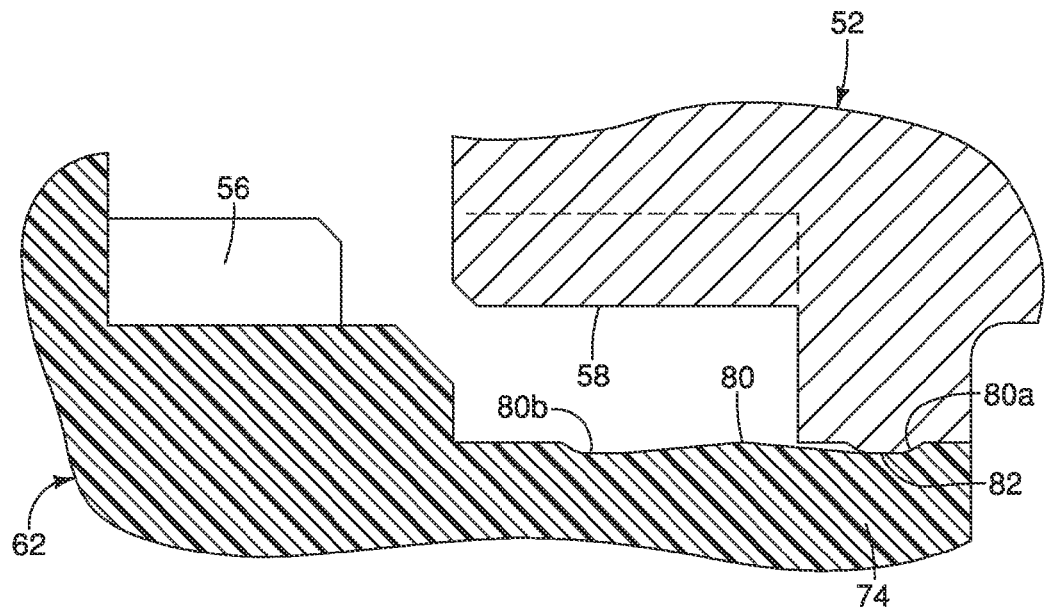
FIG. 15 is a fragmentary cross-sectional view of the retention feature of the nut member of the bicycle axle assembly in the disengaged position.
Figure 16:
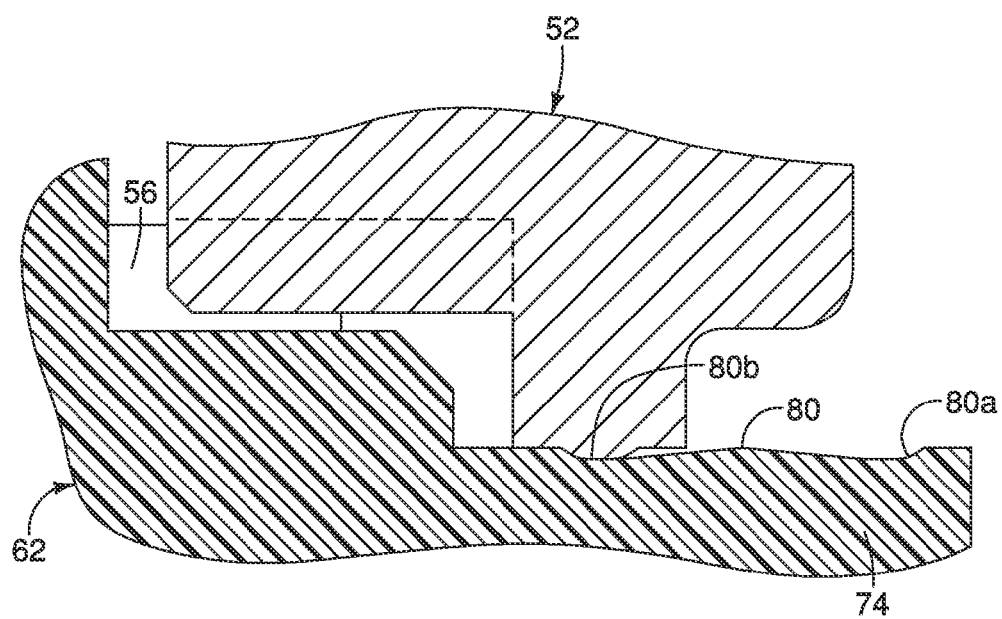
FIG. 16 is a fragmentary cross-sectional view of the retention feature of the nut member of the bicycle axle assembly in the engaged position.

The inner and outer portions 60 and 62 are fixed together as a single unit. In the illustrated embodiment, the inner portion 60 is press-fitted into the outer portion 62. The inner and outer portions 60 and 62 are configured to mate together in a coaxial arrangement. Preferably, the outer portion 62 has a cup section 64 with an internal surface that includes a plurality of ribs or projections 66 as seen in FIG. 13. The projections 66 are deformed against an outer surface of a cup section 68 of the inner portion 60 to firmly secure the inner and outer portions 60 and 62 together as a single unit.

The inner portion 60 also has a cylindrical section 70 that includes an internal thread 72 that is threadedly engaged with the external thread of the second end 34 of the shaft member 20. This cylindrical section 70 of the inner portion 60 also mates with a cylindrical section 74 of the outer portion 62. The cylindrical section 74 of the outer portion 62 also includes four arc shaped internal tabs 76 that are arranged in a circular pattern about the center longitudinal axis A. While four arc shaped internal tabs 76 are shown, fewer or more arc shaped internal tabs can be provided as needed and/or desired.

In the illustrated embodiment, the first and second parts 50 and 52 are preferably provided with an axial retention structure formed by first and second axial retention surfaces 80 and 82, respectively, that releasably mate to temporarily hold the first and second parts 50 and 52 in the engaged position and the first and second parts 50 and 52 from moving axial while the first and second parts 50 and 52 are in the engaged position. The first and second axial retention surfaces 80 and 82 form a snap fit arrangement. In the illustrated embodiment, the first axial retention surface 80 is formed on the cylindrical section 74 as an annular bump that defines a pair of annular recesses 80a and 80b.

The second part 52 is pushed towards the first part 50 for engagement of the first and second parts 50 and 52. The second part 52 is pulled away from the first part 50 for disengagement of the first and second parts 50 and 52. The "bump" between the annular recesses 80a and 80b on the first part 50 serves to hold the second part 52 in place either in the engaged or disengage positions. The outer diameter of the "bump" on the first part 50 is such that the "bump" is slightly bigger than the corresponding inner diameter of the second part 52. As a result an external force (pulling or pushing by hand) is required to move the second part 52 over the "bump" on the first part 50.

When the first external serrations 56 and the second internal serrations 58 of the first and second parts 50 and 52 are disengaged, the second axial retention surface 82 is located in the annular recesses 80a of the first axial retention surface 80 such that the first and second parts 50 and 52 can rotate independently (i.e., a "free" condition). When the first external serrations 56 and the second internal serrations 58 of the first and second parts 50 and 52 are engaged, the second axial retention surface 82 is located in the annular recesses 80b of the first axial retention surface 80 such that the first and second parts 50 and 52 will rotate together (i.e., a "lock" condition). This feature of "lock" and "free" conditions enable the shaft member 20 to be rotated to the desired orientation without affecting the overall set length of the bicycle axle assembly 14 between the head member 22 and the nut member 26.

Now, operation of the bicycle axle assembly 14 will be discussed. Initially, the first and second parts 50 and 52 are set to the "lock" position by pushing the first and second parts 50 and 52 together to engage the first external serrations 56 and the second internal serrations 58 of the first and second parts 50 and 52 are engaged. Now, the shaft member 20 with the head member 22 attached thereto is inserted into the internal bore 46 of the spindle 40 and the nut member 26 is threaded onto the second end 34 having the external thread. Next, the front bicycle hub 10 is mounted to the bicycle fork 12 with the locking projection 54 located in one of the drop-outs 48 of the front fork 12. The lever member 24 is moved to the open or release position and then rotated in a clockwise direction to tighten the bicycle axle assembly 14. The lever member 24 is continued to be rotated in a clockwise direction until resistance occurs in the rotation of the lever member 24 while the lever member 24 is parallel to the bicycle hub 10 (i.e., the lever member 24 being in the open or release position). Once resistance occurs in the rotation of the lever member 24, stop rotating the lever member 24.

Now, the second part 52 is pulled away from the first part 50 for disengagement of the first and second parts 50 and 52. A click sound is heard once the second axial retention surface 82 is located in the annular recesses 80a of the first axial retention surface 80 such that the first and second parts 50 and 52 can rotate independently (i.e., a "free" condition) without affect the axial distance between the head member 22 and the nut member 26. With the lever member 24 still in the open or release position, the lever member 24 can now be rotated to the proper or desired orientation with respect to the fork end of the front fork 12. Then, gripping the fork end of the front fork 12 with your fingers and using the palm of your hand to close the lever member 24 with as much strength as possible. With the bicycle axle assembly 14 locked onto the fork ends of the front fork 12, the second part 52 is pushed towards the first part 50 for engagement of the first and second parts 50 and 52. A click sound would indicate that engagement between the first and second parts 50 and 52 is completed by the second axial retention surface 82 engaging the annular recesses 80b of the first axial retention surface 80.

Now, subsequent wheel removal can be easily accomplished with the wheel having the same axle retaining force that was provided prior to removal of the wheel from the bicycle frame. With one hand holding the bicycle, open the lever member 24 with the other hand and rotate the lever member 24 in the counterclockwise direction. Count the number of turns made with the lever member 24. Remove the wheel and proceed with the intended service.

Subsequent wheel installation of the same wheel, without changes made to bicycle axle assembly 14 can now be accomplished as follows. With one hand holding the bicycle, set the wheel on the fork end and ensure that the locking projection 54 of the nut member 26 sits in the opening of the fork ends of the bicycle fork 12. Turn the lever member 24 in the clockwise direction for the same number of turns counted previously during wheel removal. The lever member 24 would return to almost the same orientation upon the number of turns is reached. Now close the lever member 24 to secure the front bicycle hub 10 and the wheel to the bicycle fork 12.

Figure 17:
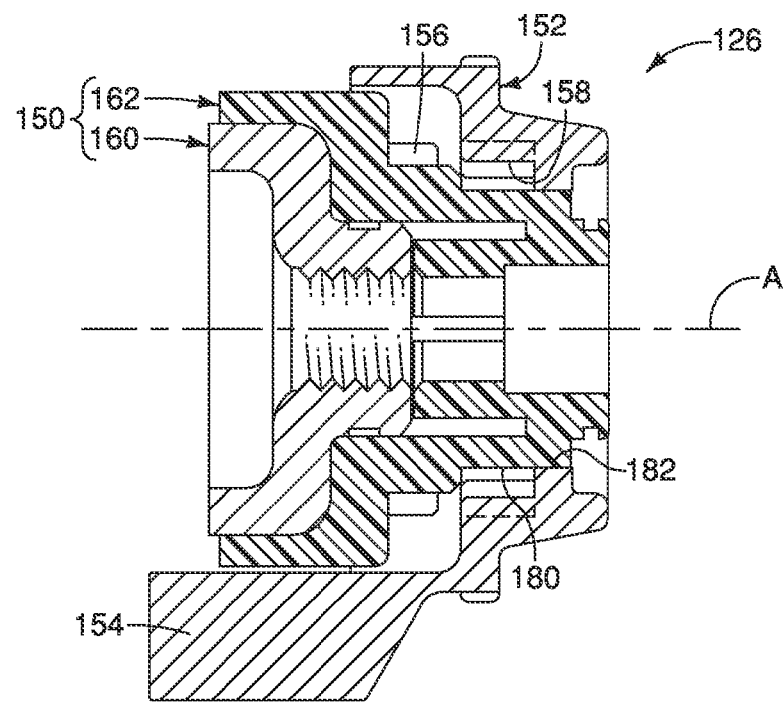
FIG. 17 is a cross-sectional view of a nut member in accordance with another exemplary embodiment with the nut member in a disengaged position.
Figure 18:
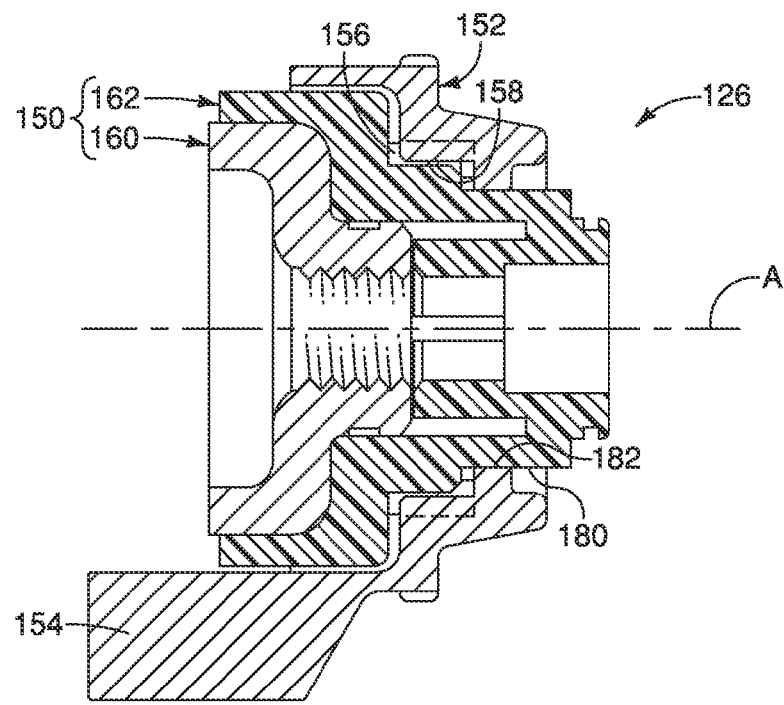
FIG. 18 is a cross-sectional view of the nut member illustrated in FIG. 17 with the nut member in the engaged position.

Referring now to FIGS. 17 and 18, a nut member 126 is illustrated in accordance with another exemplary embodiment. The nut member 126 is designed to replace the nut member 26 in the bicycle axle assembly 14, and thus the nut member 126 is threadedly attached to the second end 34 of the shaft member 20. The nut member 126 basically includes a first part 150 and a second part 152. The second part 152 includes a locking projection 154 that is arranged to engage the drop-outs 48 of the front fork 12 similar to the first embodiment. The first part 150 includes plurality of first external serrations 156 that constitutes a first mating anti-rotational structure. The second part 152 includes plurality of second internal serrations 158 constitutes a second mating anti-rotational structure. Thus, the first and second parts 150 and 152 have mating anti-rotational structures that are identical to the first embodiment.

In the second embodiment, the first part 150 is formed of an inner portion 160 and an outer portion 162 similar to the first embodiment. The inner portion 160 is formed of a metallic material, while the outer portion 162 is formed of a non-metallic material such as a plastic resin. The first and second parts 150 and 152 mate together.

The first and second parts 150 and 152 are identical to the first and second parts 50 and 52 of the first embodiment, except that the axial retention structure has been changed. Here, in the second embodiment, the axial retention structure includes the first and second axial retention surfaces 180 and 182 on the first and second parts 150 and 152. The first and second axial retention surfaces 180 and 182 form a friction (interference) fit arrangement between the first and second parts 150 and 152. In other words, the first and second axial retention surfaces 180 and 182 are dimensioned such that first and second axial retention surfaces 180 and 182 are held against relative axial movement by friction after the first and second parts 150 and 152 are longitudinally pushed together, rather than by any other means of fastening. In the disengaged position, the friction (interference) fit arrangement between the first and second axial retention surfaces 180 and 182 also prevents relative rotational movement while the first and second parts 150 and 152 are in the disengaged position.

Figure 19:
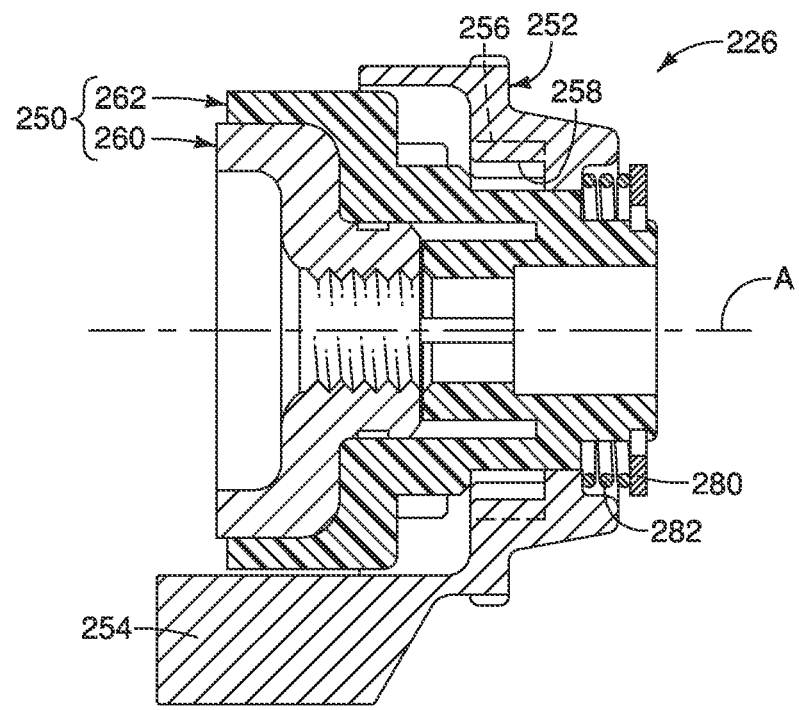
FIG. 19 is a cross-sectional view of a nut member in accordance with another exemplary embodiment with the nut member in a disengaged position.
Figure 20:
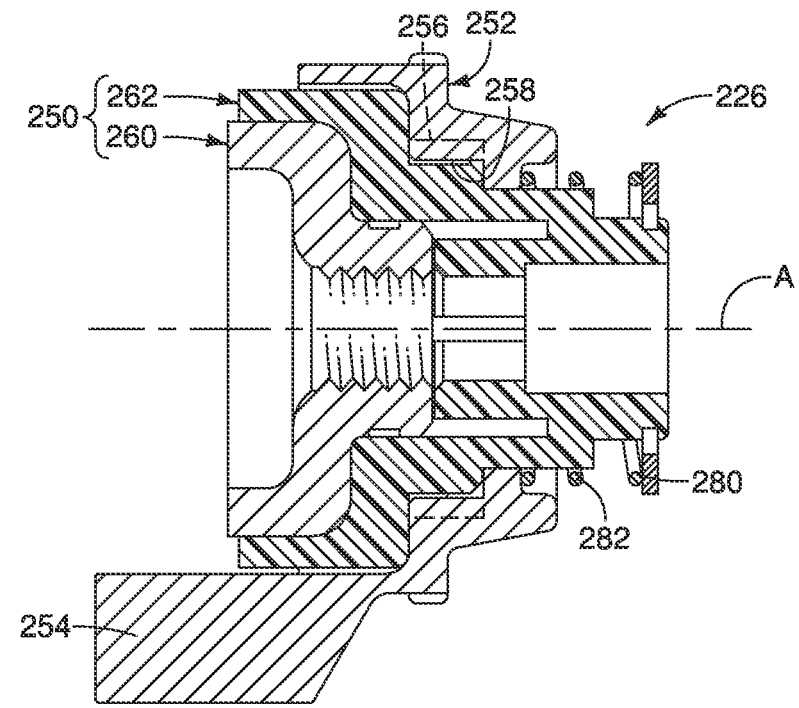
FIG. 20 is a cross-sectional view of the nut member illustrated in FIG. 19 with the nut member in the engaged position.

Referring now to FIGS. 19 and 20, a nut member 226 is illustrated in accordance with another exemplary embodiment. The nut member 226 is designed to replace the nut member 26 in the bicycle axle assembly 14, and thus the nut member 226 is threadedly attached to the second end 34 of the shaft member 20. The nut member 226 basically includes a first part 250 and a second part 252. The second part 252 includes a locking projection 254 that is arranged to engage the drop-outs 48 of the front fork 12 similar to the first embodiment. The first part 250 includes plurality of first external serrations 256 that constitutes a first mating anti-rotational structure. The second part 252 includes plurality of second internal serrations 258 constitutes a second mating anti-rotational structure. Thus, the first and second parts 250 and 252 have mating anti-rotational structures that are identical to the first embodiment.

In the third embodiment, the first part 250 is formed of an inner portion 260 and an outer portion 262 similar to the first embodiment. The inner portion 260 is formed of a metallic material, while the outer portion 262 is formed of a non-metallic material such as a plastic resin. The first and second parts 250 and 252 mate together. The first and second parts 250 and 252 are identical to the first and second parts 50 and 52 of the first embodiment, except that the axial retention structure has been changed.

Here, in the third embodiment, the axial retention structure includes the first and second axial retention parts 280 and 282 that form a biasing arrangement disposed between the first and second parts 250 and 252 and that biases the first and second parts 250 and 252 to the engaged position. In the third embodiment, for example, the first axial retention part 280 is a C-shaped retaining clip that has a plurality of tabs (nor shown) disposed in a recess of the inner portion 260 of the first part 250, while the second axial retention part 282 is a compression spring disposed between the first axial retention part 280 and the second part 252. Thus, the first and second parts 250 and 252 are normally held in the engaged position. An additional retention feature such as the recess 80a and the second axial retention surface 82 of the first embodiment can be added to temporarily hold the parts 250 and 252 in the disengaged position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle axle assembly comprising:
a nut member including a first part having an internal thread, and a second part having a projection arranged to engage a dropout of a bicycle frame,
the first and second parts having first and second anti-rotational structures, respectively, that move relative to each other between an engaged position, in which the first and second parts are non-rotatably engaged relative to each other by the first and second anti-rotational structures, and a disengaged position, in which the first and second mating anti-rotational structures are disengaged such that the first and second parts rotate relative to each other,
the first and second parts including an axial retention structure therebetween that temporarily holds the first and second parts in the engaged position and temporarily holds the first and second parts from moving in an axial direction of the nut member while the first and second parts are in the engaged position.

2. The bicycle axle assembly according to claim 1, further comprising
a shaft member having a first end and a second end with an external thread;
a head member movably disposed on a first end of the shaft member that is opposite to a second end of the shaft member that has the external thread; and
a lever member operatively mounted to move the shaft member in response to movement of the lever member.

3. The bicycle axle assembly according to claim 2, wherein the projection extends axially from the second part with respect to a center longitudinal axis of the shaft member to a location past a fork contacting surface of the first part of the nut member towards the head member.

4. The bicycle axle assembly according to claim 1, wherein the first anti-rotational structure includes a plurality of first serrations, and
the second anti-rotational structure includes a plurality of second serrations.

5. The bicycle axle assembly according to claim 4, wherein the first serrations are external serrations, and
the second part serrations are internal serrations.

6. The bicycle axle assembly according to claim 1, wherein the axial retention structure includes first and second axial retention surfaces that form a snap fit arrangement between the first and second parts.

7. The bicycle axle assembly according to claim 1, wherein the axial retention structure includes first and second axial retention surfaces that form a friction fit arrangement between the first and second parts.

8. The bicycle axle assembly according to claim 1, wherein the axial retention structure includes a biasing arrangement disposed between the first and second parts and that biases the first and second parts to the engaged position.

9. The bicycle axle assembly according to claim 1, wherein the first part includes an inner portion having the internal thread and an outer portion having the first anti-rotational structure.

10. The bicycle axle assembly according to claim 9, wherein
   the inner portion is formed of a metallic material and the outer portion is formed of a non-metallic material.

11. The bicycle axle assembly according to claim 10, wherein
   the outer portion of the first part includes a first axial retention surface, and
   the second part includes a second axial retention surface that releasably mates with the first axial retention surface to temporarily hold the first and second parts in the engaged position and to temporarily hold the first and second parts from moving in an axial direction of the shaft member.

12. A bicycle axle assembly, comprising:
   a nut member including a first part having an internal thread, and a second part having a projection arranged to engage a dropout of a bicycle frame,
   the first and second parts having first and second anti-rotational structures, respectively, that move relative to each other between an engaged position, in which the first and second parts are non-rotatably engaged relative to each other by the first and second anti-rotational structures, and a disengaged position, in which the first and second mating anti-rotational structures are disengaged such that the first and second parts rotate relative to each other, the first part including an inner portion formed of a metallic material having the internal thread and an outer portion formed of a non-metallic material having the first anti-rotational structure.

* * * * *